United States Patent
Yamamoto et al.

[11] Patent Number: 6,003,987
[45] Date of Patent: *Dec. 21, 1999

[54] INK SET RECORDING APPARATUS AND METHOD USING INK SET HAVING A DYE THAT BECOMES INSOLUBLE WHEN MIXED WITH ANOTHER DYE

[75] Inventors: Mayumi Yamamoto, Tokyo; Shinichi Tochihara, Hadano; Shinichi Sato, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/572,353

[22] Filed: Dec. 14, 1995

Related U.S. Application Data

[63] Continuation of application No. 08/117,673, Sep. 8, 1993, abandoned.

[30] Foreign Application Priority Data

Sep. 17, 1992 [JP] Japan .................................. 4-334869

[51] Int. Cl.[6] ........................................................ B41J 2/01
[52] U.S. Cl. ............................................................ 347/100
[58] Field of Search .......................... 347/100; 106/20 D, 106/31.13

[56] References Cited

U.S. PATENT DOCUMENTS

| | | | |
|---|---|---|---|
| 4,818,285 | 4/1989 | Causley et al. | 106/22 |
| 4,923,515 | 5/1990 | Koike et al. | 106/22 |
| 5,021,802 | 6/1991 | Alred | 347/100 |
| 5,078,790 | 1/1992 | Tochihara et al. | 106/20 |
| 5,080,716 | 1/1992 | Aoki et al. | 106/20 |
| 5,082,496 | 1/1992 | Yamamoto et al. | 106/22 |
| 5,099,255 | 3/1992 | Koike et al. | 346/1.1 |
| 5,118,350 | 6/1992 | Prasad | 106/22 |
| 5,123,960 | 6/1992 | Shirota et al. | 106/22 |
| 5,125,969 | 6/1992 | Nishiwaki et al. | 106/22 |
| 5,127,946 | 7/1992 | Eida et al. | 106/22 |
| 5,130,723 | 7/1992 | Yamamoto et al. | 346/1.1 |
| 5,131,949 | 7/1992 | Tochihara et al. | 106/20 |
| 5,132,700 | 7/1992 | Tochihara et al. | 346/1.1 |
| 5,135,571 | 8/1992 | Shirota et al. | 106/22 |
| 5,137,570 | 8/1992 | Nishiwaki et al. | 106/22 |
| 5,167,703 | 12/1992 | Eida et al. | 106/22 K |
| 5,178,671 | 1/1993 | Yamamoto et al. | 106/22 K |
| 5,198,023 | 3/1993 | Stoffel | 106/22 R |
| 5,213,613 | 5/1993 | Nagashima et al. | 106/20 R |
| 5,213,614 | 5/1993 | Eida et al. | 106/22 K |
| 5,215,577 | 6/1993 | Eida et al. | 106/22 K |
| 5,215,578 | 6/1993 | Eida et al. | 106/22 K |
| 5,256,194 | 10/1993 | Nishiwaki et al. | 106/22 K |
| 5,258,066 | 11/1993 | Kobayashi et al. | 106/22 R |
| 5,258,505 | 11/1993 | Eida et al. | 534/680 |
| 5,310,778 | 5/1994 | Shor et al. | 106/20 D |
| 5,371,531 | 12/1994 | Rezanka et al. | 347/43 |

Primary Examiner—Valerie Lund
Attorney, Agent, or Firm—Fitzpatrick, Cella, Harper & Scinto

[57] ABSTRACT

An ink set having (i) a black ink having a surface tension of not less than 40 dyne/cm, the black ink including a first dye; and (ii) at least one color ink having a surface tension of not more than 40 dyne/cm, the at least one color ink including a second dye which is rendered insoluble by the first dye when the black ink and the at least one color ink are mixed.

14 Claims, 2 Drawing Sheets

INK SET RECORDING APPARATUS AND METHOD USING INK SET HAVING A DYE THAT BECOMES INSOLUBLE WHEN MIXED WITH ANOTHER DYE

This application is a continuation of application Ser. No. 08/117,673 filed Sep. 8, 1993 now abandoned.

BACKGROUND OF THE INVENTION

1. Field of the Invention

The present invention relates to an ink set and a method of recording a color image on a recording material by using a combination of a plurality of inks for primary colors. In particular, the invention relates to a set of inks and an ink jet recording method which permit the formation of a sharp and high-quality image having a sufficient density.

2. Description of the Related Art

An ink jet recording method employs one of various ink discharging means for generating ink droplets including electrostatic suction means for applying a high voltage to ink, means for applying mechanical vibrations or displacement to coloring ink by using a piezoelectric element, means for heating ink to form bubbles by applying pressure thereto, and so forth. Upon recording, the ink droplets generated are ejected to adhere to a recording material such as recording paper or the like and form ink dots. This recording method causes less noise and enables high-speed printing and multicolor printing.

The printed images recorded by this ink jet recording method are used for various applications, such as observation of a surface image recorded on a recording material such as paper, ink jet recording paper or the like, or observation of an image recorded on a light-transmitting recording material by projecting the image on a screen or the like using an optical apparatus such as a slide, OHP (Over Head Projector) or the like. The recorded images are also used for a color separation plate for forming a color printing positive plate; CMF (Color Mosaic Filter) used in a liquid crystal color display and the like.

On the other hand, a typical example of recording processes used for forming color images by such an ink jet recording method is a subtractive color mixture process.

When a color image is formed by the subtractive color mixture process, the three primary colors of cyan (C), magenta (M) and yellow (Y) are generally used.

Colors which can be produced by mixing the primary colors in the same pixel, i.e., superposing ink droplets having different colors in the same pixel, include the following four colors:

(1) C+M=B (blue)
(2) C+Y=G (green)
(3) M+Y=R (red)
(4) C+M+Y=Bk (black)

The colors which can be produced by the primary colors C, M and Y are basically seven colors including C, M, Y, R, G, B and Bk. A multicolor image having two or more of the seven colors is referred to as a "false color image".

Thus, when an image is recorded by this recording method, inks for the primary colors C, M and Y may be prepared.

However, when the color Bk is produced by the primary colors of C, M and Y, the color Bk is printed by superposing ink droplets of the primary colors C, M and Y. In this case, since the amounts of the ink droplets of the respective primary colors are substantially the same, the ink droplets of the three colors in a Bk portion are superposed and adhere to a recording material, and the dot formed is excessively enlarged, as compared with a dot formed by each of the colors other than Bk, which comprises only one or two of the three primary colors. This causes the problem of line thickening and thus forming an unnatural image, or the problem that the ink is not sufficiently absorbed by the recording material because large amounts of the inks are used. Since an image is frequently recorded with the color Bk, these problems are very important.

In order to overcome the problems, inks of the three primary colors C, M and Y are generally used, and a fourth ink of the color Bk is used for producing the color Bk.

When inks of the four colors C, M, Y and Bk are used for recording, however, since ink droplets of two different colors are superposed in a printed portion of each of the colors B, G and R, as described above, if a recording material is composed of wood free paper containing a sizing agent, a large duration of time is required for absorbing large amounts of ink droplets. Consequently, the ink droplets enter gaps between the fibers of the paper not only in the sectional direction of the recording material but also in all other directions thereof during the absorption over the large time duration. This causes the formation of nonuniform dots and line thickening, i.e., so-called feathering. There is thus the problem of recording an unclear image without edge sharpness.

In addition, even when ink droplets having two different colors are placed adjacent to each other, the unfixed portions of the ink droplets are mixed at the boundaries therebetween, thereby causing bleeding at the boundaries between different colors and thus resulting in an unclear image.

A possible method of solving the above problems is to increase the speed of penetration of ink droplets into the recording material. This method may decrease the surface tension of each color ink and thus realize an improvement in the wettability of the recording material by the ink.

However, when the surface tension of each ink is decreased, the dots formed on the recording material are excessively enlarged, thereby causing line thickening. Alternatively, an increase in the penetration causes the coloring materials to deeply penetrate into the recording material, and thus decreases the color density.

As described above, the color Bk is frequently used for characters. If a character of the color Bk could have a higher color density than that of a character of each of the other colors, and could further have a sharp edge without unnatural thickening, the character so formed would have a preferred appearance.

SUMMARY OF THE INVENTION

Accordingly, an object of the present invention is to overcome the problems of prior art, and to provide (i) an ink jet recording method of recording a color image by using inks of at least three colors including the color Bk which can form a Bk image having a high color density and edge sharpness on recording paper having high flexibility and a high degree of sizing, and (ii) an ink set used in the above-described method.

Another object of the present invention is to provide an ink jet recording method which can form a clear color image (i) without irregular line thickening when inks of two different colors are printed at the same time as a Bk image, and (ii) without bleeding at boundaries when inks of different colors are printed adjacent to each other.

In order to achieve these and other objects, the present invention provides an ink set comprising a black ink and at least one color ink, wherein the black ink has a surface tension of no less than 40 dyne/cm or more, and the at least one color ink has a surface tension of not more than 40 dyne/cm. The set of inks further comprises a combination of dyes which are made insoluble when the black ink and the at least one color ink are mixed.

In an embodiment of the present invention, a set of inks comprises color inks including cyan ink, magenta ink, and yellow ink.

In another embodiment of the present invention, a set of inks comprises a black ink comprising a cationic dye, and color inks each comprising an anionic dye.

In still another embodiment of the present invention, a set of inks comprises a black ink comprising an anionic dye, and color inks each comprising a cationic dye.

In a further embodiment of the present invention, a black ink comprises a water-soluble dye, and a plurality of color inks each comprises an oil-soluble dye.

The present invention also provides an ink jet recording method for recording an image on uncoated paper using the above described ink set, wherein ink droplets are discharged from orifices by applying thermal energy to the inks used.

The present invention further provides an ink jet recording apparatus comprising a plurality of recording units each having a head portion which is filled with each of the inks in the ink set so as to discharge ink droplets of each ink. The head portion has a heat generating portion for applying thermal energy to the inks used.

According to another aspect of the present invention, an ink set comprising (i) a black ink having a surface tension of not less than 40 dyne/cm, the black ink including at first dye; and (ii) at least one color ink having a surface tension of not more than 40 dyne/cm, the at least one color ink including a second dye which is rendered insoluble by the first dye when the black ink and the at least one color ink are mixed.

According to yet a further aspect of the present invention, an ink jet recording method for recording an image on a recording material comprises the steps of (i) providing a black ink having a surface tension of not less than 40 dyne/cm, the black ink including at first dye; (ii) providing at least one color ink having a surface tension of nor more than 40 dyne/cm, the at least one color ink including a second dye which is rendered insoluble by the first dye when the black ink and the at least one color in are mixed; and (iii) applying the black ink and the at least one color ink to the recording material to form the image.

According to still a further aspect of the present invention, an ink jet recording apparatus comprises (a) an ink set comprising (i) a black ink having a surface tension of not less than 40 dyne/cm, the black ink including at first dye; and (ii) at least one color ink having a surface tension of not more than 40 dyne/cm, the at least one color ink including a second dye which is rendered insoluble by the first dye when the black ink and the at least one color ink are mixed; and (b) a plurality of recording units for discharging ink droplets, each of the plurality of recording units having a head portion filled with the ink set.

DESCRIPTION OF THE PREFERRED EMBODIMENTS

Figure 1:
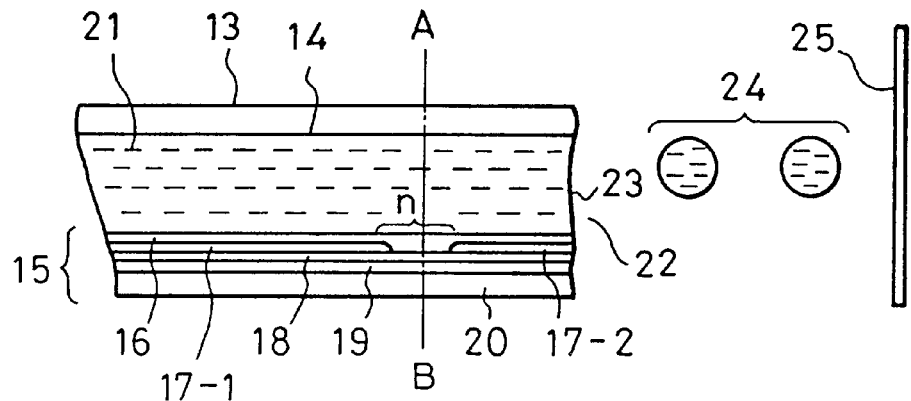
FIG. 1 is a longitudinal sectional view showing a head portion of an ink jet recording apparatus.

In an ink jet recording method for recording a color image on a recording material (for example, uncoated paper) that uses inks of at least three colors including black, in accordance with a first embodiment of the present invention, a cationic dye is used as a color component of a black ink, an anionic dye is used as a color component of each of the other color inks, the black ink has a surface tension of 40 dyne/cm or more, and each of the inks other than the black ink has a surface tension of 40 dyne/cm or less. In an ink jet recording method for recording a color image on a recording material (for example, uncoated paper) that uses inks of at least three colors including black, in accordance with a second embodiment of the present invention, an anionic dye is used as a color component of a black ink, a cationic dye is used as a color component of each of the other color inks, the black ink has a surface tension of 40 dyne/cm or more, and each of the inks other than the black ink has a surface tension of 40 dyne/cm or less. In an ink jet recording method for recording a color image on a recording material (for example, uncoated paper) that uses inks of at least three colors including black in accordance with a third embodiment of the present invention, a water-soluble dye is used as a color component of a black ink, an oil-soluble dye is used as a color component of each of the other color inks, the black ink has a surface tension of 40 dyne/cm or more, and each of the inks other than the black ink has a surface tension of 40 dyne/cm or less.

In the ink jet recording method in accordance with the first embodiment of the present invention, a cationic dye is used as the color component of the black ink, and an anionic dye is used as the color component of each of the cyan, magenta and yellow inks so as to prevent the color mixing caused by the use of dyes which become insoluble when inks other than the black ink are simultaneously superposed, or when inks of different colors are printed adjacent to each other before one of the color inks dries on the recording material. Thus, the recording method can decrease the feathering caused by unstable line thickening, and the bleeding at the boundaries between adjacent different colors.

In the ink jet recording method in accordance with the second embodiment of the present invention, an anionic dye is used as the color component of the black ink, and a cationic dye is used as the color component of each of the cyan, magenta and yellow inks so as to prevent the color mixing caused by the use of dyes which become insoluble when inks other than the black ink are simultaneously superposed, or when inks of different colors are printed adjacent to each other before one of the color inks dries on the recording material. Thus, the recording method can decrease the feathering caused by unstable line thickening, and the bleeding at the boundaries between adjacent different colors.

In the ink jet recording method in accordance with the third embodiment of the present invention, a water-soluble dye is used as the color component of the black ink, and an oil-soluble dye is used as the color component of each of the cyan, magenta and yellow inks so as to prevent color mixing caused by the use of dyes which become insoluble when inks other than the black ink are simultaneously superposed, or when inks of different colors are printed adjacent to each other before one of the color inks dries on the recording material. Thus, the recording method can decrease the feathering caused by unstable line thickening, and the bleeding at the boundaries between adjacent different colors.

Further, in any one of the embodiments, since the black ink has a surface tension of 40 dyne/cm or more, the speed of penetration of the ink into a recording material having a high degree of sizing is limited, thereby preventing bleeding of the ink and producing a black image having a high color density and a sharp edge.

On the other hand, since each of the C, M and Y color inks other than the Bk ink, all of which may be used in the recording method of the present invention, has a surface tension of 40 dyne/cm or less, the C, M and Y color inks rapidly penetrate into the recording material, thereby preventing feathering when ink droplets are superposed, or bleeding when droplets are printed adjacent to each other.

First and Second Embodiments

Each of the inks used in the ink jet recording method according to each of the first and second embodiments of the present invention is formed by dissolving a dye compound in an appropriate liquid medium. Although the concentration of the liquid medium in the ink is appropriately determined according to demand, the concentration is generally 0.1 to 15% by weight, preferably 0.5 to 10% by weight, and more preferably 1 to 5% by weight.

The liquid medium used in the present invention is appropriately selected from commonly known organic solvents as appropriate.

Examples of such organic solvents include alkyl alcohols each having 1 to 4 carbon atoms, such as methyl alcohol, ethyl alcohol, n-propyl alcohol, iso-propyl alcohol, n-butyl alcohol, sec-butyl alcohol, tert-butyl alcohol, iso-butyl alcohol and the like;

ketones or ketone alcohols such as acetone, diacetone alcohol and the like; alkanolamines such as monoethanolamine, diethanolamine and the like; amides such as dimethylformamide, dimethylacetamide and the like; ethers such as tetrahydrofuran, dioxane and the like; polyhydric alcohols each containing an alkylene group having 2 to 6 carbon atoms, such as ethylene glycol, diethylene glycol, triethylene glycol, propylene glycol, thiodiglycol, butylene glycol, glycerin and the like; lower alkyl mono- or di-ethers (having 3 to 8 carbon atoms in total), such as ethylene glycol monomethyl (ethyl or propyl) ether, diethylene glycol monomethyl (ethyl or butyl) ether, diethylene glycol dimethyl (ethyl) ether, polyethylene glycol monomethyl (ethyl) ether and the like, each of which is deviated from an alkylene glycol; nitrogen-containing five-membered ring ketones such as 2-pyrrolidone, N-methyl-2-pyrrolidone and the like; intramolecular esters of oxycarboxylic acids, such as α-valerolactone, ε-caprolactone, butyl lactone and the like; morpholine; dimethylimidazolidine sulfolan and the like.

Such a mixture form has the advantage of inhibiting changes in the physical or chemical properties (for example, the pH value) of an ink over a long period (for example, six months or at least one year).

In addition, the content of the water-soluble organic solvent used in an ink is generally 5 to 90%, preferably 10 to 80%, and more preferably 10 to 50%. The water content is generally 10 to 90%, preferably to 70%, and more preferably 20 to 70%.

First Embodiment

In the recording method according to the first embodiment of the present invention, any one of the present dyes and the newly synthesized dyes can preferably be used as the anionic dye as the color component of each of the color inks other than the black ink as long as the dye has proper color tone and concentration. Most of the direct dyes, acid dyes and reactive dyes can be used, and a mixture of at least two of these dyes can also be used.

Examples of such anionic dyes include the following:

C. I. Direct Yellow 8, 11, 12, 27, 28, 33, 39, 44, 50, 58, 85, 86, 87, 88, 89, 98, 100 and 110;

C. I. Direct Red 2, 4, 9, 11, 20, 23, 21, 31, 39, 46, 62, 75, 79, 80, 83, 89, 95, 197, 201, 218, 220, 224, 225, 226, 227, 228 and 230;

C. I. Direct Blue 1, 15, 22, 25, 41, 76, 77, 80, 86, 90, 98, 106, 108, 120, 158, 163, 168, 199 and 226;

C. I. Acid Yellow 1, 3, 7, 11, 17, 23, 25, 29, 36, 38, 40, 42, 76, 98 and 99;

C. I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289;

C. I. Acid Blue 1, 7, 9, 15, 22, 23, 25, 29, 40, 43, 59, 62, 74, 78, 80, 90, 100, 102, 104, 117, 127, 138, 158 and 161;

C. I. Reactive Yellow 2, 3, 17, 25, 37 and 42;

C. I. Reactive Red 7, 12, 13, 15, 17, 20, 23, 24, 31, 42, 45, 46 and 59;

C. I. Reactive Blue 4, 5, 7, 13, 14, 15, 18, 19, 21, 26, 27, 29, 32, 40, 44 and 100;

C. I. Food Yellow 3; and

C. I. Food Red 87, 92 and 94.

Examples of cationic dyes which are preferably used as the color component of the black ink in the recording method according to the first embodiment of the present invention include the following:

C. I. Basic Black 2 and 8;

Aizen Cathilon Black SBH, BXH, SH, ACH, MH and TH (produced by Hodogaya Chemical);

Sumiacryl Black B, R, AP, BP, CP and FFP (produced by Sumitomo Chemical); and

Diacryl Supra Black GSL, RSL and ESL (Mitsubishi Chemical).

Second Embodiment

In the recording method according to the second embodiment of the present invention, any one of the present dyes and the newly synthesized dyes can preferably be used as the anionic dye as the color component of the black ink as long as the dye has proper color tone and concentration. Most of the direct dyes, acid dyes and reactive dyes can be used, and a mixture of at least two of these dyes can also be used.

Examples of such anionic dyes include the following:

C. I. Direct Black 17, 19, 22, 31, 32, 51, 62, 71, 74, 112, 113, 154 and 168;

C. I. Acid Black 2, 48, 51, 52, 110, 115 and 156;

C. I. Reactive Black 1, 8, 12 and 13; and

C. I. Food Black 1 and 2.

Examples of cationic dyes which are preferably used as the color component of each of the color inks other than the black ink in the recording method according to the second embodiment include the following:

C. I. Basic Yellow 1, 11, 13, 19, 25, 33 and 36;

C. I. Basic Red 1, 2, 9, 12, 13, 38, 39 and 92; and

C. I. Basic Blue 1, 3, 5, 9, 19, 24, 25, 26, 28, 45, 54 and 65.

Third Embodiment

In the recording method according to the third embodiment of the present invention, any one of the above-described present and newly synthesized dyes can preferably be used as the water-soluble dye as the color component of the black ink as long as the dye has proper color tone and concentration. Most of direct dyes, acid dyes and reactive dyes can be used, and a mixture of at least two of these dyes can also be used.

In the recording method according to the third embodiment, any one of the present and the newly synthesized dyes can preferably be used as the oil-soluble dye as the color component of each of the inks other than the black ink as long as the dye has proper color tone and concentration. Most of dyes can be used, and a mixture of at least two of these dyes can also be used.

Examples of such oil-soluble dyes include the following:

C. I. Solvent Blue 33, 38, 42, 45, 53, 65, 67, 70, 104, 114, 115 and 135;

C. I. Solvent Red 25, 31, 86, 92, 97, 118, 132, 160, 186, 187 and 219; and

C. I. Solvent Yellow 1, 49, 62, 74, 79, 82, 83, 89, 90, 120, 121, 151, 153 and 154.

At the time of use in the present invention, one of the above oil-soluble dyes is dissolved in an appropriate liquid medium. Although the concentration of the oil-soluble dye in the recording solution is appropriately determined according to demand, the concentration is generally 0.1 to 15% by weight, preferably 0.5 to 10% by weight, and more preferably 1 to 8% by weight.

The liquid medium used in the present invention is appropriately selected from commonly known organic solvents as appropriate. Examples of such organic solvents include the following:

monohydric alcohols such as methanol, ethanol, propanol and the like;

polyhydric alcohols such as ethylene glycol, diethylene glycol, triethylene glycol, tetraethylene glycol, glycerine, propylene glycol and the like;

hydroxy ethers such as ethylene glycol monomethyl (or ethyl) ether, diethylene glycol monomethyl (or ethyl) ether, diethylene glycol monobutyl ether, propylene glycol monomethyl (or ethyl) ether and the like;

esters of hydroxy ethers, such as ethylene glycol monomethyl ether acetate, diethylene glycol monoethyl ether acetate and the like;

esters such as ethyl acetate, propyl acetate, butyl acetate and the like;

hydrocarbons such as toluene, xylene, ligroin, ethylcyclohexane, petroleum benzine, isobar and the like;

acetonitrile;

formamide;

N,N-dimethylformamide;

dimethylsulfoxide;

sulfolan;

N-methyl-2-pyrrolidone and the like.

These solvents may be used either singly or in mixture of at least two solvents.

First to Third Embodiments

Each of the inks prepared by the above method and used in the present invention exhibits an excellent affinity for a recording material having a high degree of sizing and high-speed recording properties, and produces a recorded image having an excellent optical density, color tone, water resistance, friction resistance or light resistance.

The inks are also practical recording solutions which exhibit excellent preservation stability, signal responsibility, droplet formation stability, discharging stability or continuous recording properties.

Each of the inks used in the recording method of the present invention may contain the above various components and various additives for improving the physical properties values of the ink. Examples of such additives include a pH adjustor, a drying inhibitor comprising a crystalline organic compound such as urea or the like, a viscosity modifier, a surface tension modifier such as various surfactants, a mildewproofing or germicide and the like. Particularly, in a recording method of electrically charging and deflecting ink droplets, a resistivity adjustor may be added to the inks.

In the recording method of the present invention, the liquid medium component or various additives are added to the inks so as to obtain desired physical property values, as described above, and the thus-prepared inks are used in various ink jet recording methods to form a high-quality image with a high density.

The recording method of the present invention uses inks of at least three colors including black and forms an image by the ink jet recording process. Any one of the generally known ink jet recording processes can be used in the method of the invention. Namely, various ink jet recording apparatus other than a recording apparatus having a recording head of the type that employs mechanical vibrations of a piezoelectric oscillator for generating ink droplets may preferably be used. For example, the method of the invention may be applied to a recording apparatus in which ink droplets are generated by supplying a recording signal in the form of thermal energy to the ink contained in a recording head.

The inks used in the method of the present invention may be used for writing utensils such as a marking pen, a fountain pen and the like. However, when the inks are used for writing utensils, it is necessary to adjust various properties such as the viscosity, the surface tension and so on.

A description will now be made of the above recording apparatus in which ink droplets are generated by supplying thermal energy corresponding to a recording signal to the ink contained in a recording head, and which is applied to the method of the present invention.

Figure 2:
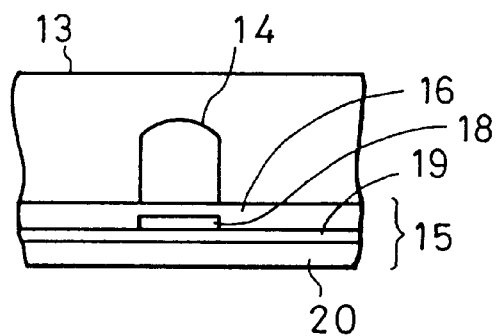
FIG. 2 is a lateral sectional view showing a head portion of an ink jet recording apparatus.
Figure 3:
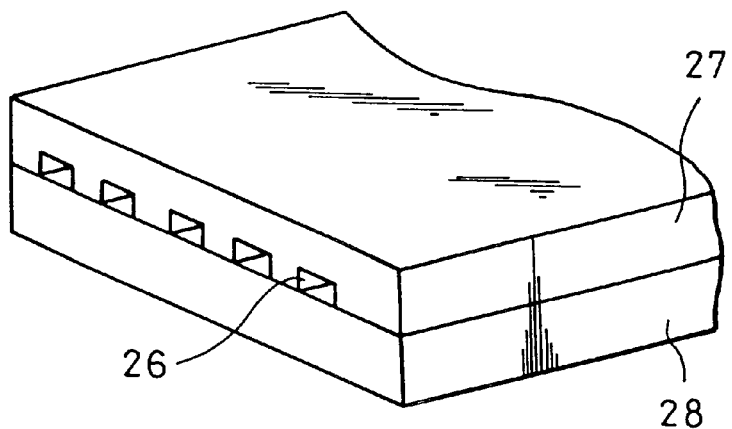
FIG. 3 is a perspective view showing a multiple head comprising a plurality of the heads shown in FIG. 1.

FIGS. 1, 2 and 3 respectively show examples of the configuration of a head as a principal portion of such a recording apparatus.

A head 13 is formed by bonding a glass, ceramic or plastic plate having a groove 14 for passing an ink therethrough to a heat generating head 15 (the head is not limited to that shown in the drawings) used for thermal recording. The heat generating head 15 comprises a protective film 16 made of silicon oxide or the like, aluminum electrodes 17-1 and 17-2, a heat generating resistor layer 18, a heat accumulating layer 19, and a heat radiating substrate 20 made of alumina or the like.

An ink 21 reaches a discharge orifice (fine hole) 22 and forms a meniscus 23 under pressure P.

When an electrical signal is supplied to the electrodes 17-1 and 17-2, a region n of the heat generating head 15 abruptly generates heat to generate bubbles in the ink 21 which contacts the region n. The meniscus 23 is projected by the pressure produced by the generation of bubbles, and the ink 21 is thus discharged from the orifice 22 to form recording droplets 24. The droplets 24 are ejected to a recording material 25. FIG. 3 shows the appearance of a multi-head comprising a plurality of the heads shown in FIG. 1, which are arranged in parallel. The multi-head is produced by bonding a glass plate 27 having multiple grooves 26 to the same heat generating head 28 as that shown in FIG. 1. FIG. 1 is a sectional view of the head 13 taken along the ink passage thereof, and FIG. 2 is a sectional view taken along line A–B in FIG. 1.

Figure 4:
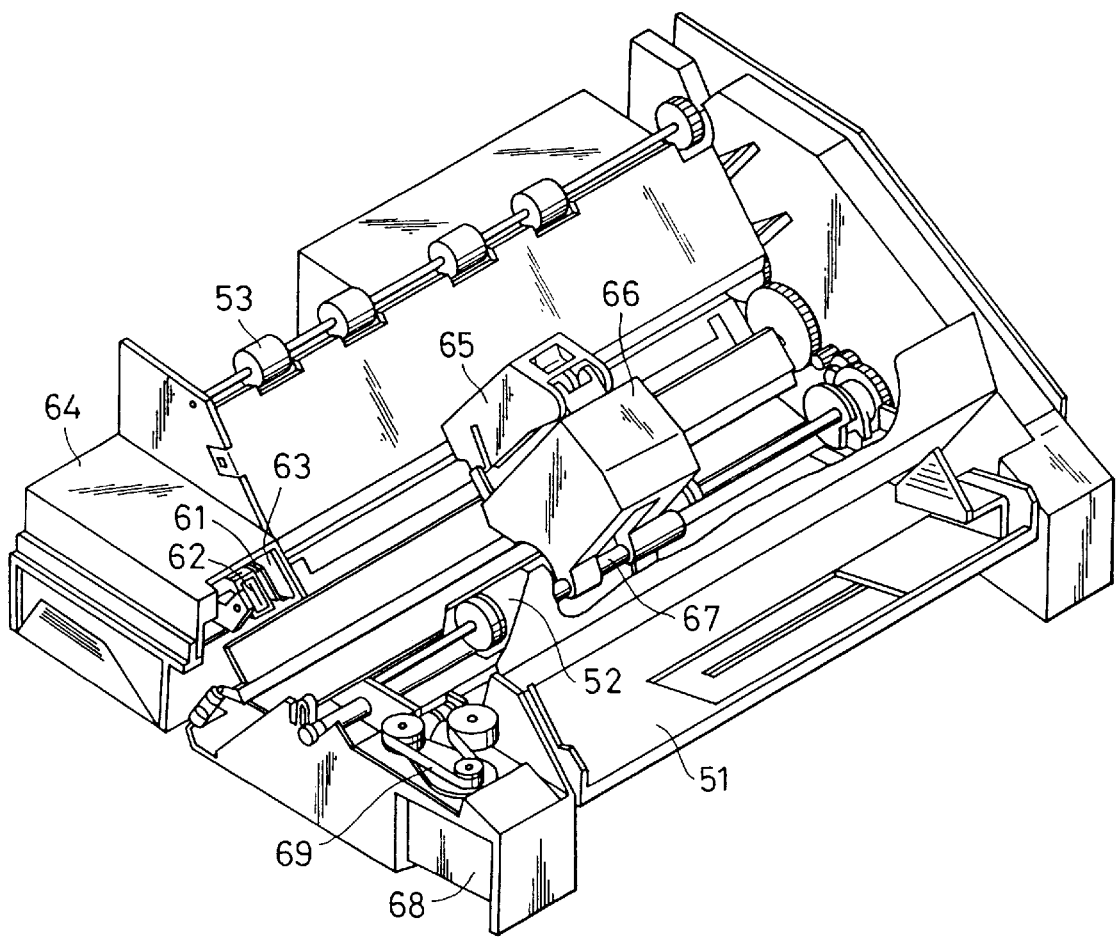
FIG. 4 is a perspective view showing an example of an ink jet recording apparatus.

FIG. 4 shows an example of ink jet recording apparatus in which such a head is incorporated.

In FIG. 4, reference numeral 61 denotes a blade serving as a wiping member, one end of which is held by a blade holding member to form a fixed end. The blade 61 thus in a cantilever form. The blade 61 is disposed adjacent to a recording region for the recording head. In this example, the blade 61 is held in a state wherein it projects to the movement passage for the recording head. Reference numeral 62 denotes a cap which is disposed at a home position adjacent to the blade 61 and which is moved in the direction vertical to the moving direction of the recording head to cap the discharge orifice surface in contact therewith. Reference numeral 63 denotes an absorber which is provided adjacent to the blade 61 and which is held in the state wherein it projects to the movement passage for the recording head, as the blade 61. The blade 61, the cap 62 and the absorber 63 constitute a discharge recovery portion 64, and the blade 61 and the absorber 63 function to remove moisture, dust and the like from the discharge orifice surface.

Reference numeral 65 denotes the recording head having discharge energy generating means so as to discharge an ink to a recording material opposite to the discharge orifice surface having discharge orifices; and reference numeral 66 denotes a carriage for moving the recording head 65 loaded thereon. The carriage 66 slidably engages with a guide shaft 67, a portion of the carriage 66 being connected (not shown) to a belt 69 driven by a motor 68. The carriage 66 can thus be moved along the guide shaft 67 within the recording region for the recording head 65 and a region adjacent thereto.

Reference numeral 51 denotes a paper feeding portion for inserting the recording material, and reference numeral 52 denotes a feed roller driven by a motor (not shown). These members feed the recording material to a position opposite to the discharge orifice surface of the recording head 65, and discharge the recording material to a delivery portion provided with delivery rollers 53 as recording proceeds.

In the above configuration, when the recording head 65 is returned to the home position at the end of recording or the like, although the cap 62 of the head recovery portion 64 is retracted from the movement passage for the recording head 65, the blade 61 is projected to the movement passage. As a result, the discharge orifice surface of the recording head 65 is wiped by the blade 61. When the discharge orifice surface of the recording head 65 is capped by the cap 62 in contact therewith, the cap 62 is moved so as to project to the movement passage for the recording head 65.

When the recording head 65 is moved to a recording start position from the home position, the cap 62 and the blade 61 are respectively at the same positions as in the wiping operation described above. During this movement, the discharge orifice surface of the recording head 65 is consequently wiped.

The recording head is moved to the home position adjacent to the recording region not only at the times of an end of recording and a discharge recovery, but also during movement of the recording head within the recording region for recording at predetermined intervals. The discharge orifice surface is wiped as the recording head is moved to the home position.

EXAMPLES

The ink jet recording method of the present invention is described in further detail below with reference to examples and comparative example. Examples 1 to 7 and Comparative Examples 1 to 6 relate to the first embodiment of the present invention, and Examples 8 to 14 and Comparative Examples 7 to 12 relate to the second embodiment of the present invention. Example 15 to 21 and Comparative Examples 13 to 18 relate to the third embodiment of the present invention.

First Embodiment

Examples 1 to 7

Table 1 shows the components and component ratios of each of the inks of four primary colors Bk, C, M and Y used in each of the examples.

Each of the inks was prepared by sufficiently mixing and dissolving the components in a container, filtering the resultant solution using a Teflon filter having a pore size of 1 $\mu$m under pressure, and then deaerating the filtrate by a vacuum pump.

TABLE 1

(each numeral in parentheses indicates a component ratio)

| | Black ink | Cyan ink | Magenta ink | Yellow ink |
|---|---|---|---|---|
| Example 1 | Aizen Cathilon Black BXH (3) (Hodogaya Chemical) Ethyl alcohol (5) Ethylene glycol (15) Water (77) | C. I. Direct Blue 86 (3) Ethyl alcohol (5) Ethylene glycol (15) Emulgen 909 (Kao) (1) Water (76) | C. I. Acid Red 92 (3) Ethyl alcohol (5) Ethylene glycol (15) Emulgen 909 (Kao) (1) Water (76) | C. I. Acid Yellow 23 (3) Ethyl alcohol (5) Ethylene glycol (15) Emulgen 909 (Kao) (1) Water (76) |
| Example 2 | Aizen Cathilon Black SH (3) (Hodogaya Chemical) N-methyl-2-pyrrolidone (7) Glycerol (10) 2-propanol (3) Water (77) | C. I. Direct Blue 199 (3) N-methyl-2-pyrrolidone (7) Glycerol (10) 2-propanol (3) Emulgen 707 (Kao) (0.5) Water (76.5) | C. I. Reactive Red 23 (3) N-methyl-2-pyrrolidone (7) Glycerol (10) 2-propanol (3) Emulgen 707 (Kao) (0.5) Water (76.5) | C. I. Direct Yellow 142 (3) N-methyl-2-pyrrolidone (7) Glycerol (10) 2-propanol (3) Emulgen 707 (Kao) (0.5) Water (76.5) |
| Example 3 | Aizen Cathilon Black TH (Hodogaya Chemical) (3) Diethylene glycol (20) Water (77) | C. I. Reactive Blue 14 (6) Diethylene glycol (20) Acetylenol EH (Kawaken Fine Chemical) (0.5) Water (73.5) | Dye of Compound (I) (3) Diethylene glycol (20) Acetylenol EH (Kawaken Fine Chemical) (0.5) Water (73.5) | C. I. Direct Yellow 86 (3) Diethylene glycol (20) Acetylenol EH (Kawaken Fine Chemical) (0.5) Water (73.5) |
| Example 4 | Diacryl Supra Black GSL (Mitsubish) | C. I. Reactive Blue 100 (5) 2-pyrroli- | C. I. Acid Red 289 (3) 2-pyrrolidone (5) | C. I. Direct Yellow 98 (3) 2-pyrroli- |

TABLE 1-continued (each numeral in parentheses indicates a component ratio)

| | Black ink | Cyan ink | Magenta ink | Yellow ink |
|---|---|---|---|---|
| | (3)<br>2-pyrroli-<br>done (5)<br>Thiodi-<br>glycol<br>(10)<br>Benzyl<br>alcohol<br>(2)<br>Water (80) | done (5)<br>Thiodi-<br>glycol<br>(10)<br>Benzyl<br>alcohol<br>(2)<br>Acetylenol<br>EH<br>(Kawaken<br>Fine<br>Chemical)<br>(0.2)<br>Water<br>(77.5) | Thiodi-<br>glycol<br>(10)<br>Benzyl<br>alcohol<br>(2)<br>Acetylenol<br>EH<br>(Kawaken<br>Fine<br>Chemical)<br>(0.2)<br>Water<br>(77.5) | done (5)<br>Thiodi-<br>glycol<br>(10)<br>Benzyl<br>alcohol<br>(2)<br>Acetylenol<br>EH<br>(Kawaken<br>Fine<br>Chemical)<br>(0.2)<br>Water<br>(77.5) |
| Example 5 | Diacryl<br>Supra<br>Black RSL<br>(Mitsu-<br>bishi) (3)<br>Tetra-<br>ethylene<br>glycol (5)<br>Thiodi-<br>glycol<br>(10)<br>2-propanol<br>(3)<br>Water (79) | C. I.<br>Direct<br>Blue 199<br>(3)<br>Tetra-<br>ethylene<br>glycol (5)<br>Thiodi-<br>glycol (5)<br>2-propanol<br>(3)<br>Emulgen<br>909 (Kao)<br>(2)<br>Water (72) | Dye of<br>Compound<br>(I) (3)<br>Tetra-<br>ethylene<br>glycol (5)<br>Thiodi-<br>glycol (5)<br>2-propanol<br>(3)<br>Emulgen<br>909 (Kao)<br>(2)<br>Water (72) | C. I.<br>Direct<br>Yellow (3)<br>Tetra-<br>ethylene<br>glycol (5)<br>Thiodi-<br>glycol (5)<br>2-propanol<br>(3)<br>Emulgen<br>909 (Kao)<br>(2)<br>Water (72) |
| Example 6 | Diacryl<br>Supra<br>Black ESL<br>(Mitsu-<br>bishi) (3)<br>Ethylene<br>glycol<br>(10)<br>Sulfolan<br>(5)<br>Cyclo-<br>hexanol<br>(2)<br>Water (80) | C. I.<br>Direct<br>Blue 86<br>(3)<br>Ethylene<br>glycol<br>(10)<br>Sulfolan<br>(5)<br>Cyclo-<br>hexanol<br>(2)<br>Acetylenol<br>EH<br>(Kawaken<br>Fine<br>Chemical)<br>(1)<br>Water (79) | C. I. Acid<br>Red 289<br>(3)<br>Ethylene<br>glycol<br>(10)<br>Sulfolan<br>(5)<br>Cyclo-<br>hexanol<br>(2)<br>Acetylenol<br>EH<br>(Kawaken<br>Fine<br>Chemical)<br>(1)<br>Water (79) | C. I.<br>Direct<br>Yellow 23<br>(5)<br>Ethylene<br>glycol<br>(10)<br>Sulfolan<br>(5)<br>Cyclo-<br>hexanol<br>(2)<br>Acetylenol<br>EH<br>(Kawaken<br>Fine<br>Chemical)<br>(1)<br>Water (79) |
| Example 7 | Aizen<br>Cathilon<br>Black GH<br>(1.5)<br>Aizen<br>Cathilon<br>Black SH<br>(Hodogaya<br>Chemical)<br>(1.5)<br>Glycerol<br>(10)<br>N-methyl-<br>2-pyrroli-<br>done<br>(5)<br>Water (72) | C. I.<br>Direct<br>Blue 86<br>(3)<br>Ethylene<br>glycol<br>(10)<br>Sulfolan<br>(5)<br>Cyclo-<br>hexanol<br>(2)<br>Acetylenol<br>EH<br>(Kawaken<br>Fine<br>Chemical)<br>(1)<br>Water (79) | C. I. Acid<br>Red 289<br>(3)<br>Ethylene<br>glycol<br>(10)<br>Sulfolan<br>(5)<br>Cyclo-<br>hexanol<br>(2)<br>Acetylenol<br>EH<br>(Kawaken<br>Fine<br>Chemical)<br>(1)<br>Water (79) | C. I.<br>Direct<br>Yellow 23<br>(3)<br>Ethylene<br>glycol<br>(10)<br>Sulfolan<br>(5)<br>Cyclo-<br>hexanol<br>(2)<br>Acetylenol<br>EH<br>(Kawaken<br>Fine<br>Chemical)<br>(1)<br>Water (79) |

The compound (I) shown in Table 1 is expressed by the following formula:

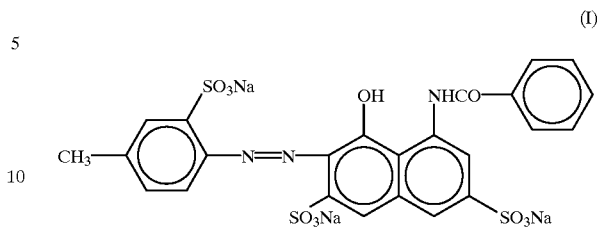

(I)

As a result of the below-noted evaluations $T_1$ through $T_{10}$ using a recording apparatus having an on-demand type recording head (discharge orifice diameter of 50 μm, piezo-electric oscillator driving voltage of 60 V, and frequency 4 KHz) for discharging each of the above inks by using a piezoelectric oscillator, good results were obtained.

$T_1$ Long-term preservability of ink;

Each ink was closed in a glass container and preserved for six months at each of −30° C. and 60° C. As a result, no insoluble substance was observed six months after, and the physical properties and color tone of each of the inks were not changed.

$T_2$ Discharge stability;

Discharge was continuously made for 24 hours in an atmosphere at each of the room temperatures, 5° C. and 40° C. As a result, high-quality recording could stably be made under any conditions. The viscosity of each ink at 5° C. was 13 cps, and the viscosity at 40° C. was 5 cps.

$T_3$ Discharge responsibility;

Discharge was intermittently made at intervals of 2 seconds and was made after each ink was allowed to stand for 2 months. As a result, in all cases, uniform recording could stably be made without clogging the orifice tip.

$T_4$ Quality of printed matter;

An image was recorded by using each of the recording materials shown in Table 2. The recorded image had a high density and clearness. After the recorded image was exposed to room light for 3 months, the density was decreased by only 1% or less.

$T_5$ Fixing properties of C, M and Y inks to various recording materials;

A printed portion was rubbed with human fingers five seconds after an image was printed on each of the recording materials shown in Table 2. The recording materials were examined for the presence of friction marks or bleeding. As a result, all images showed neither friction marks nor bleeding, and all images exhibited excellent fixing properties.

$T_6$ Fixing properties of Bk ink to various recording materials;

A printed image was rubbed with human fingers five seconds and 30 seconds after being printed on each of the recording materials shown in Table 2. The recording materials were examined for the presence of friction marks or bleeding of the images. As a result, although all images showed friction marks and bleeding five seconds or less after printing, neither friction marks nor bleeding were observed 30 seconds after printing.

$T_7$ Quality of Bk single-color printing on various recording materials;

An image was printed on each of the recording materials shown in Table 2 using a Bk ink only, and the printing quality of the resultant single-color image was evaluated. As a result, the ink dot had a sharp edge portion, and no feathering was observed. The diameter of the dot formed by the Bk ink only was always smaller than that of the dot printed by each of C, M and Y inks.

$T_8$ Quality of two-color mixture printing on various recording materials;

Two of Bk, C, M and Y inks were superposed on the same point in each of the recording materials shown in Table 2, and the printing quality of the two-color mixture image obtained was evaluated. As a result, the dot was not irregularly spread.

$T_9$ Bk color density on various recording materials;

Solid printing was made on each of the recording materials shown in Table 2 using a Bk ink. At this time, the color density was at least 1.2 relative to the image density (OD).

$T_{10}$ Boundary bleeding between solid printings of different colors on various recording materials;

Immediately after solid printing was made on each of the recording materials shown in Table 2 using one ink, solid printing was made using a different color ink so as to be adjacent to the first printing. In this case, substantially no bleeding was observed.

TABLE 2

Type of Recording Material

| Recording material | Class | Manufacturer |
| --- | --- | --- |
| Ginwa | Wood free paper | Sanyo Kokusaku Pulp Co., Ltd. |
| Seven Stars | Wood free paper | Hokuetsu Paper Mills, Ltd. |
| Shiro-botan | Medium quality paper | Honshu Paper Co., Ltd. |
| Toyo Filter No. 4 | Non-sized paper | Toyo Paper Co., Ltd. |

Evaluation

Table 3 below shows the surface tension of each of the inks used in Examples 1 to 7 of an embodiment of the method of the present invention, and the results of the evaluations $T_6$ to $T_{10}$ of the characteristics of the image obtained in each of the examples.

TABLE 3

Evaluation Results

| No. | Surface tension of ink (dyne/cm) | $T_6$ Fixing time (sec.) | $T_7$ Printing quality of Bk | $T_8$ Two-color mixture printing quality | $T_9$ OD value of Bk | $T_{10}$ Boundary bleeding between different colors |
| --- | --- | --- | --- | --- | --- | --- |
| Example 1 | Bk≧40 C,M,Y ≦40 | Bk>5 C,M,Y, ≦5 | good | good | 1.2≦ | good |
| Example 2 | Bk≧40 C,M,Y ≦40 | Bk>5 C,M,Y ≦5 | good | good | 1.2≦ | good |
| Example 3 | Bk≧40 C,M,Y ≦40 | Bk>5 C,M,Y ≦5 | good | good | 1.2≦ | good |
| Example 4 | Bk≧40 C,M,Y ≦40 | Bk>5 C,M,Y, ≦5 | good | good | 1.2≦ | good |
| Example 5 | Bk≧40 C,M,Y ≦40 | Bk>5 C,M,Y, ≦5 | good | good | 1.2≦ | good |
| Example 6 | Bk≧40 C,M,Y ≦40 | Bk>5 C,M,Y, ≦5 | good | good | 1.2≦ | good |
| Example 7 | Bk≧40 C,M,Y ≦40 | Bk>5 C,M,Y, ≦5 | good | good | 1.2≦ | good |

The same evaluations as those described above were made by using a recording apparatus having an on-demand type multihead (discharge orifice diameter of $35\mu$, resistance value of heat generating resistor of 150 Ω. driving voltage of 30 V, frequency of 2 KHz) in which thermal energy is supplied to the ink contained in the head to generate ink droplets. In all evaluations, good results were obtained.

Comparative Examples 1 to 6

Each of inks having the components and composition ratios shown in Table 4 was prepared by the same method as that employed in the examples, and was subjected to the same evaluations as those in the examples.

As a result, in all comparative examples, the evaluation items $T_7$ to $T_{10}$ were not simultaneously satisfied, as shown in the Table 5 below.

TABLE 4

(each numeral in parentheses indicates a component ratio)

| | Black ink | Cyan ink | Magenta ink | Yellow ink |
| --- | --- | --- | --- | --- |
| Comparative Example 1 | Aizen Cathilon Black BXH (Hodogaya Chemical) (3) Ethyl alcohol (5) Ethylene glycol (15) Emulgen 909 (Kao) (1) Water (76) | C. I. Direct Blue 86 (3) Ethyl alcohol (5) Ethylene glycol (15) Emulgen 909 (Kao) (1) Water (76) | C. I. Acid Red 92 (3) Ethyl alcohol (5) Ethylene glycol (15) Emulgen 909 (Kao) (1) Water (76) | C. I. Acid Yellow 23 (3) Ethyl alcohol (5) Ethylene glycol (15) Emulgen 909 (Kao) (1) Water (76) |
| Comparative Example 2 | C. I. Food Black 2 (3) Ethyl alcohol (5) Ethylene glycol (15) | C. I. Direct Blue 86 (3) Ethyl alcohol (5) Ethylene glycol | C. I. Acid Red 92 (3) Ethyl alcohol (5) Ethylene glycol (15) Emulgen | C. I. Acid yellow 23 (3) Ethyl alcohol (5) Ethylene glycol (15) |

TABLE 4-continued (each numeral in parentheses indicates a component ratio)

| | Black ink | Cyan ink | Magenta ink | Yellow ink |
|---|---|---|---|---|
| | Emulgen 909 (Kao) (1) Water (76) | (15) Emulgen 909 (Kao) (1) Water (76) | 909 (Kao) (1) Water (76) | Emulgen 909 (Kao) (1) Water (76) |
| Comparative Example 3 | C. I. Food Black 2 (3) Ethyl alcohol (5) Ethylene glycol (15) Water (77) | C. I. Direct Blue 86 (3) Ethyl alcohol (5) Ethylene glycol (15) Water (77) | C. I. Acid Red 92 (3) Ethyl alcohol (5) Ethylene glycol (15) Water (77) | C. I. Acid Yellow 23 (3) Ethyl alcohol (5) Ethylene glycol (15) Water (77) |
| Comparative Example 4 | C. I. Direct Black 19 (3) Propylene glycol (15) Triethanol-amine (2) 2-propanol (3) Acetylenol EH (Kawaken Fine Chemical) (2) Water (75) | C. I. Reactive Blue 14 (6) Propylene glycol (15) Triethanol-amine (2) 2-propanol (3) Acetylenol EH (Kawaken Fine Chemical) (2) Water (75) | Dye of Formula (I) (3) Propylene glycol (15) Triethanol-amine (2) 2-propanol (3) Acetylenol EH (Kawaken Fine Chemical) (2) Water (75) | C. I. Direct Yellow 142 (3) Propylene glycol (15) Triethanol-amine (2) 2-propanol (3) Acetylenol EH (Kawaken Fine Chemical) (2) Water (75) |
| Comparative Example 5 | Aizen Cathilon Black SH (Hodogaya Chemical) (3) N-methyl-2-pyrrolidone (7) Glycerol (10) Cyclohexanol (2) Acetylenol EH (Kawaken Fine Chemical) (1) Water (77) | C. I. Reactive Blue 14 (6) Propylene glycol (15) Triethanol-amine (2) 2-propanol (3) Acetylenol EH (Kawaken Fine Chemical) (2) Water (75) | Dye of Formula (I) (3) Propylene glycol (15) Triethanol-amine (2) 2-propanol (3) Acetylenol EH (Kawaken Fine Chemical) (2) Water (75) | C. I. Direct Yellow 142 (3) Propylene glycol (15) Triethanol-amine (2) 2-propanol (3) Acetylenol EH (Kawaken Fine Chemical) (2) Water (75) |
| Comparative Example 6 | C. I. Direct Black 168 (3) Thiodiglycol (10) Monoethanolamine (5) Ethyl alcohol (4) Water (78) | C. I. Direct Blue 199 (6) Thiodiglycol (10) Monoethanolamine (5) Ethyl alcohol (4) Water (78) | Dye of Formula (I) (3) Thiodiglycol (10) Monoethanolamine (5) Ethyl alcohol (4) Water (78) | C. I. Direct Yellow 86 (3) Thiodiglycol (10) Monoethanolamine (5) Ethyl alcohol (4) Water (78) |

TABLE 5

Evaluation Results

| No. | $T_5$ Surface tension of ink (dyne/cm) | $T_6$ Fixing time (sec.) | $T_7$ Printing quality of Bk | $T_8$ two-color mixture printing quality | $T_9$ OD value of Bk | $T_{10}$ Boundary bleeding between different colors |
|---|---|---|---|---|---|---|
| Comparative example 1 | Bk≦40 C,M,Y ≦40 | Bk≦5 C,M,Y ≦5 | large dot size, and dim edge | good | 1.2> | good |
| Comparative example 2 | Bk≦40 C,M,Y ≦40 | Bk≦5 C,M,Y ≦5 | large dot size, and dim edge | good | 1.2> | good |
| Comparative example 3 | Bk>40 C,M,Y <40 | Bk>5 C,M,Y >5 | good | non-uniform dot shape and noticeable feathering | 1.2≧ | noticeable boundary bleeding |
| Comparative example 4 | Bk≦40 C,M,Y ≦40 | Bk≦5 C,M,Y ≦5 | large dot size, and dim edge | good | 1.2> | good |
| Comparative example 5 | Bk≦40 C,M,Y ≦40 | Bk≦5 C,M,Y ≦5 | large dot size, and dim edge | good | 1.2> | good |
| Comparative example 6 | Bk≦40 C,M,Y ≦40 | Bk>5 C,M,Y ≦5 | good | When Bk and one of C, M and Y were superposed, the dot shape was nonuniform, and feathering was noticeable. | 1.2> | Boundary bleeding between Bk and one of C, M and Y was noticeable. |

Second Embodiment

Examples 8 to 12

The second embodiment of the present invention is described below with reference to examples and comparative examples.

Table 6 shows the components and component ratios of each of the inks of the four primary colors Bk, C, M and Y used in each of the examples.

Each of the inks was prepared by mixing and dissolving the components in a container, filtering the resultant solution using a Teflon filter with a pore size of 1 μm under pressure and then deaerating the filtrate by using a vacuum pump.

TABLE 6

(each numeral in parentheses indicates a component ratio)

| | Black ink | Cyan ink | Magenta ink | Yellow ink |
|---|---|---|---|---|
| Example 8 | C.I. Food Black (3) Ethyl alcohol (5) Ethylene glycol (15) Water (76.9) | C.I. Basic Blue 3 (3) Ethyl alcohol (5) Ethylene glycol (15) Emulgen 909 (Kao) (0.1) Water (76.9) | C.I. Basic Red 12 (3) Ethyl alcohol (5) Ethylene glycol (15) Emulgen 909 (Kao) (0.1) Water (76.9) | C.I. Basic Yellow 19 (3) Ethyl alcohol (5) Ethylene glycol (15) Emulgen 909 (Kao) (0.1) Water (76.9) |
| Example 9 | C.I. Food Black (3) Diethylene glycol (20) Water (77) | C.I. Basic Blue 5 (3) Diethylene glycol (20) Emulgen 909 (Kao) (0.1) Water (76.9) | C.I. Basic Red 14 (3) Diethylene glycol (20) Emulgen 909 (Kao) (0.1) Water (76.9) | C.I. Basic Yellow 33 (3) Diethylene glycol (20) Emulgen 909 (Kao) (0.1) Water (76.9) |
| Example 10 | C.I. Direct Black 19 (3) Propylene glycol (15) Tri-ethanol amine (2) 2-propanol (3) Water (77) | C.I. Basic Blue 9 (3) Propylene glycol (15) 2-propanol (3) Acetylenol EH (Kawaken Fine Chemical) (4) Water (75) | C.I. Basic Red 36 (3) Propylene glycol (15) 2-propanol (3) Acetylenol EH (Kawaken Fine Chemical) (4) Water (75) | C.I. Basic Yellow 36 (3) Propylene glycol (15) 2-propanol (3) Acetylenol EH (Kawaken Fine Chemical) (4) Water (75) |
| Example 11 | C.I. Direct Black 51 (3) 2-pyrrolidone (20) Benzyl alcohol (2) Water (75) | C.I. Basic Blue 19 (5) 2-pyrrolidone (20) Benzyl alcohol (2) Acetylenol EH (Kawaken Fine Chemical) (0.2) Water (74.8) | C.I. Basic Red 38 (3) 2-pyrrolidone (20) Benzyl alcohol (2) Acetylenol EH (Kawaken Fine Chemical) (0.2) Water (74.8) | C.I. Basic Yellow 19 (3) 2-pyrrolidone (20) Benzyl alcohol (2) Acetylenol EH (Kawaken Fine Chemical) (0.2) Water (74.8) |
| Example 12 | C.I. Direct Black 168 (3) Thio-diglycol (10) Mono-ethanol amine (5) 1-propanol (2) Water (80) | C.I. Basic Blue 28 (3) Thio-diglycol (15) Emulgen 909 (kao) (5) Water (77) | C.I. Basic Red 39 (3) Thio-diglycol (15) Emulgen 909 (Kao) (5) Water (77) | C.I. Basic Yellow 33 (3) Thio-diglycol (15) Emulgen 909 (Kao) (5) Water (77) |
| Example 13 | Dye of Compound (II) (1.5) C.I. Food Black 2 (1.5) Tetra-ethylene glycol (5) Thio-diglycol (10) 2-propanol (3) Water (79) | C.I. Basic Blue 54 (1.5) C.I. Basic Blue 59 (1.5) Tetra-ethylene glycol (5) Thio-diglycol (10) 2-propanol (3) Emulgen 707 (Kao) (1) Water (79) | C.I. Basic Red 24 (1.5) C.I. Basic Red 27 (1.5) Tetra-ethylene glycol (5) Thio-diglycol (10) 2-propanol (3) Emulgen 707 (Kao) (1) Water (79) | C.I. Basic Yellow 19 (1.5) C.I. Basic Yellow 36 (1.5) Tetra-ethylene glycol (5) Thio-diglycol (10) 2-propanol (3) Emulgen 707 (Kao) (1) Water (79) |
| Example 14 | Dye of Compound (II) (1.8) Dye of Compound (III) (1.2) Ethylene glycol (10) Urea (5) Cyclo-hexanol (2) Water (80) | Diacryl Supra Brilliant Blue 2B (Mitsubishi) (3) Ethylene glycol (10) Emulgen 909 (Kao) (5) Cyclo-hexanol (2) Water (80) | Diacryl Supra Brilliant Red 3B (Mitsubishi) (3) Ethylene glycol (10) Emulgen 909 (Kao) (5) Cyclo-hexanol (2) Water (80) | C.I. Basic Yellow 33 (3) Ethylene glycol (10) Emulgen 909 (Kao) (5) Cyclo-hexanol (2) Water (80) |

The compounds (II) and (III) shown in the above Table 6 are expressed by the following formulas:

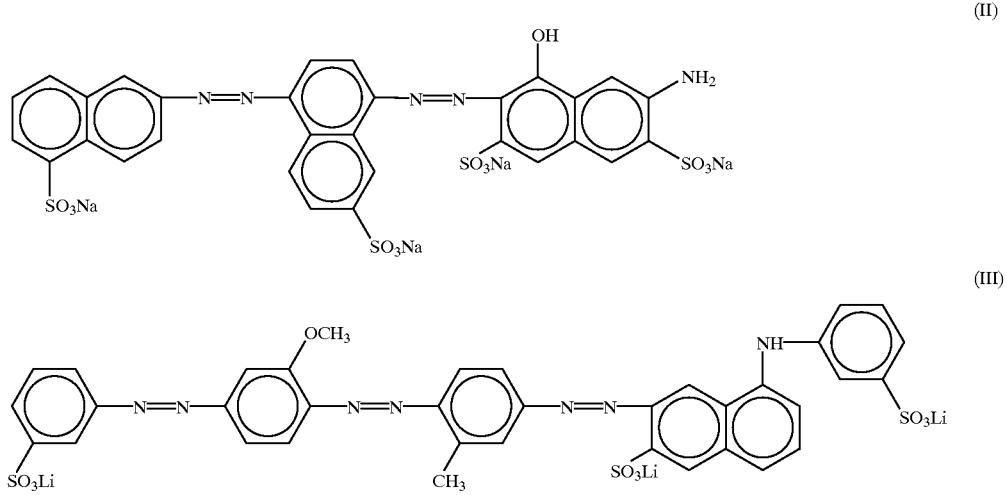

(II)

(III)

The evaluations $T_1$ to $T_{10}$ were made by the same method as that employed in Examples 1 to 7 with the exception that the each of the inks of the above Examples 8 to 14 and a recording apparatus having an on-demand type recording head (discharge orifice diameter of 50 μm, piezoelectric oscillator driving voltage of 60 V, frequency of 4 KHz) which employs a piezoelectric oscillator for discharging an ink) were used. In all evaluations, good results were obtained, as in Examples 1 to 7.

Table 7 shows the surface tension of each of the inks used in Examples 8 to 14 of the method of the present invention, and the results of the evaluations $T_6$ to $T_{10}$ of the images obtained in the examples.

TABLE 7

| | Evaluation Results | | | | |
|---|---|---|---|---|---|
| No. | Surface tension of ink (dyne/cm) | $T_6$ Fixing time (sec.) | $T_2$ Printing quality of Bk | $T_8$ Two-color mixture printing quality | $T_9$ OD value | $T_{10}$ Boundary bleeding between different colors |
| Example 8 | Bk ≧ 40 C, M, Y ≦ 40 | Bk > 5 C, M, Y, ≦ 5 | good | good | 1.2≦ | good |
| Example 9 | Bk ≧ 40 C, M, Y ≦ 40 | Bk > 5 C, M, Y ≦ 5 | good | good | 1.2≦ | good |
| Example 10 | Bk ≧ 40 C, M, Y ≦ 40 | Bk > 5 C, M, Y ≦ 5 | good | good | 1.2≦ | good |
| Example 11 | Bk ≧ 40 C, M, Y ≦ 40 | Bk > 5 C, M, Y, ≦ 5 | good | good | 1.2≦ | good |
| Example 12 | Bk ≧ 40 C, M, Y ≦ 40 | Bk > 5 C, M, Y, ≦ 5 | good | good | 1.2≦ | good |
| Example 13 | Bk ≧ 50 C, M, Y ≦ 40 | Bk > 50 C, M, Y, ≦ 5 | good | good | 1.2≦ | good |

TABLE 7-continued

| | Evaluation Results | | | | |
|---|---|---|---|---|---|
| No. | Surface tension of ink (dyne/cm) | $T_6$ Fixing time (sec.) | $T_2$ Printing quality of Bk | $T_8$ Two-color mixture printing quality | $T_9$ OD value | $T_{10}$ Boundary bleeding between different colors |
| Example 14 | Bk ≧ 40 C, M, Y ≦ 40 | Bk > 5 C, M, Y, ≦ 5 | good | good | 1.2≦ | good |

When the same evaluations as those described above were made by using a recording apparatus having an on-demand type multihead (discharge orifice diameter of 35μ, heating resistor resistance of 160 Ω, driving voltage of 30 V, frequency of 2 KHz) in which thermal energy is supplied to the ink contained in the recording head to generate droplets, excellent results were obtained.

Comparative Examples 7 to 12

Each of inks having the components and component ratios shown in Table 8 was prepared as a comparative example and was evaluated by the same method as that employed in the examples.

As a result, in all comparative examples, the items of the evaluations $T_7$ to $T_{10}$ were not simultaneously satisfied, as shown in Table 9.

TABLE 8

(each numeral in parentheses indicates a component ratio)

| | Black ink | Cyan ink | Magenta ink | Yellow ink |
|---|---|---|---|---|
| Comparative | C.I. Food Black 1 | C.I. Basic Blue | C.I. Basic Red | C.I. Acid Yellow 23 |

TABLE 8-continued (each numeral in parentheses indicates a component ratio)

|  | Black ink | Cyan ink | Magenta ink | Yellow ink |
|---|---|---|---|---|
| Example 7 | (3) Ethyl alcohol (5) Ethylene glycol (15) Emulgen 909 (Kao) (0.1) Water (76.9) | 3 (3) Ethyl alcohol (5) Ethylene glycol (15) Emulgen 909 (Kao) (0.1) Water (76.9) | 12 (3) Ethyl alcohol (5) Ethylene glycol (15) Emulgen 909 (Kao) (0.1) Water (76.9) | (3) Ethyl alcohol (5) Ethylene glycol (15) Emulgen 909 (Kao) (0.1) Water (76.9) |
| Comparative Example 8 | Aizen Cathilon Black BXH (Hodogaya Chemical) (3) Ethyl alcohol (5) Ethylene glycol (15) Emulgen 909 (Kao) (0.1) Water (76.9) | C.I. Basic Blue 3 (3) Ethyl alcohol (5) Ethylene glycol (15) Emulgen 909 (Kao) (0.1) Water (76.9) | C.I. Basic Red 12 (3) Ethyl alcohol (5) Ethylene glycol (15) Emulgen 909 (Kao) (0.1) Water (76.9) | C.I. Acid Yellow 23 (3) Ethyl alcohol (5) Ethylene glycol (15) Emulgen 909 (Kao) (0.1) Water (76.9) |
| Comparative Example 9 | Aizen Cathilon Black BXH (Hodogaya Chemical) (3) Ethyl alcohol (5) Ethylene glycol (15) Water (77) | C.I. Basic Blue 3 (3) Ethyl alcohol (5) Ethylene glycol (15) Water (77) | C.I. Basic Red 12 (3) Ethyl alcohol (5) Ethylene glycol (15) Water (77) | C.I. Acid Yellow 23 (3) Ethyl alcohol (5) Ethylene glycol (15) Water (77) |
| Comparative Example 10 | Aizen Cathilon Black SH (Hodogaya Chemical) (3) N-methyl-2-pyrrolidone (7) Glycerol (10) 2-propanol (3) Acetylenol EH (Kawaken Fine Chemical) (2) Water (75) | C.I. Basic Blue 3 (3) N-methyl-2-pyrrolidone (7) Glycerol (10) 2-propanol (3) Acetylenol EH (Kawaken Fine Chemical) (2) Water (75) | C.I. Basic Red 33 (3) N-methyl-2-pyrrolidone (7) Glycerol (10) 2-propanol (3) Acetylenol EH (Kawaken Fine Chemical) (2) Water (75) | C.I. Acid Yellow 19 (3) N-methyl-2-pyrrolidone (7) Glycerol (10) 2-propanol (3) Acetylenol EH (Kawaken Fine Chemical) (2) Water (75) |
| Comparative Example 11 | C.I. Direct Black 168 (3) Thiodiglycol (10) Monoethanolamine (5) 1-propanol (2) | C.I. Basic Blue 28 (3) Thiodiglycol (10) Monoethanolamine (5) i-propanol (2) | C.I. Basic Red 39 (3) Thiodiglycol (10) Monoethanolamine (5) i-propanol (2) | C.I. Basic Yellow 36 (3) Thiodiglycol (10) Monoethanolamine (5) 1-propanol |
| | (2) Acetylenol EH (Kawaken Fine Chemical) (2) Water (78) | Acetylenol EH (Kawaken Fine Chemical) (2) Water (78) | Acetylenol EH (Kawaken Fine Chemical) (2) Water (78) | (2) Acetylenol EH (Kawaken Fine Chemical) (2) Water (78) |
| Comparative Example 12 | C.I. Direct Black 115 (3) Glycerol (10) Urea (10) Benzyl alcohol (2) Water (75) | C.I. Direct Blue 86 (3) Glycerol (10) Urea (10) Benzyl alcohol (2) Acetylenol EH (Kawaken Fine Chemical) (5) Water (70) | C.I. Acid Red 92 (3) Glycerol (10) Urea (10) Benzyl alcohol (2) Acetylenol EH (Kawaken Fine Chemical) (5) Water (70) | C.I. Acid Yellow 23 (3) Glycerol (10) Urea (10) Benzyl alcohol (2) Acetylenol EH (Kawaken Fine Chemical) (5) Water (70) |

Evaluation Results

| No. | Surface tension of ink (dyne/cm) | $T_6$ Fixing time (sec.) | $T_7$ Printing quality of Bk | $T_8$ two-color mixture printing quality | $T_9$ OD value of Bk | $T_{10}$ Boundary bleeding between different colors |
|---|---|---|---|---|---|---|
| Comparative example 7 | Bk ≤ 40 C, M, Y ≤ 40 | Bk ≤ 5 C, M, Y ≤ 5 | large dot size, and dim edge | good | 1.2> | good |
| Comparative example 8 | Bk ≤ 40 C, M, Y ≤ 40 | Bk ≤ 5 C, M, Y ≤ 5 | large dot size, and dim edge | good | 1.2> | good |
| Comparative example 9 | Bk > 40 C, M, Y > 40 | Bk > 5 C, M, Y > 5 | good | non-uniform dot shape and noticeable feathering | 1.2≤ | noticeable boundary bleeding |
| Comparative Example 10 | Bk ≤ 40 C, M, Y ≤ 40 | Bk ≤ 5 C, M, Y ≤ 5 | large dot size, and dim edge | good | 1.2> | good |
| Comparative | Bk ≤ 40 C, M, Y ≤ | Bk ≤ 5 C, M, Y ≤ | large dot | good | 1.2> | good |

-continued

Evaluation Results

| No. | Surface tension of ink (dyne/cm) | $T_6$ Fixing time (sec.) | $T_7$ Printing quality of Bk | $T_8$ two-color mixture printing quality | $T_9$ OD value of Bk | $T_{10}$ Boundary bleeding between different colors |
|---|---|---|---|---|---|---|
| ative Example 11 | 40 | 5 | size, and dim edge good | | | |
| Comparative Example 12 | Bk ≧ 40 C, M, Y ≦ 40 | Bk ≦ 5 C, M, Y ≦ 5 | | When Bk and one of C, M and Y were superposed, the dot shape is non-uniform and feathering was noticeable. | 1.2≦ | Boundary bleeding between Bk and one of C, M, and Y was noticeable. |

Third Embodiment

Examples 15 to 21

The third embodiment of the present invention is described below with reference to examples and comparative examples.

Table 10 shows the components and component ratios of each of the inks of the four primary colors Bk, C, M and Y used in each of the examples.

Each of the inks was prepared by mixing and dissolving the components in a container, filtering the resultant solution by a Teflon filter with a pore size of 1 μm under pressure, and then deaerating the filtrate by using a vacuum pump.

TABLE 10

(each numeral in parentheses indicates a component ratio)

| | Black ink | Cyan ink | Magenta ink | Yellow ink |
|---|---|---|---|---|
| Example 15 | C.I. Food Black 1 (3) Ethyl alcohol (5) Ethylene glycol (15) Water (77) | C.I. Solvent Blue 33 (3) Ethyl alcohol (70) Ethylene glycol (25) | C.I. Solvent Red 25 (3) Ethyl alcohol (70) Ethylene glycol (25) | C.I. Solvent Yellow 1 (5) Ethyl alcohol (70) Ethylene glycol (25) |
| Example 16 | C.I. Direct Black 51 (3) 2-pyrrolidone (20) Benzyl alcohol (2) Water (75) | C.I. Solvent Blue 67 (6) Ethylene glycol monoethyl ether (94) | C.I. Solvent Red 132 (6) Ethylene glycol monoethyl ether (94) | C.I. Solvent Yellow 153 (6) Ethylene glycol monoethyl ether (94) |
| Example 17 | C.I. Direct Black 168 (3) Thiodiglycol (10) Monoethanolamine (5) 1-propanol (2) water (80) | C.I. Solvent Blue 115 (3) Butyl acetate (95) Emulgen 909 (Kao) (2) | C.I. Solvent Red 219 (3) Butyl acetate (95) Emulgen 909 (Kao) (2) | C.I. Solvent Yellow 121 (3) Butyl acetate (95) Emulgen 909 (Kao) (2) |
| Example 18 | Aizen Cathilon Black BXH (Hodogaya Chemical) (3) N-methyl-2-pyrrolidone (7) Glycerol (10) Water (80) | C.I. Solvent Blue 65 (3) C.I. Solvent Blue 67 (4) Ethyl alcohol (93) | C.I. Solvent Red 118 (3) C.I. Solvent Red 132 (4) Ethyl alcohol (93) | C.I. Solvent Yellow 151 (3) C.I. Solvent Yellow 153 (4) Ethyl alcohol (93) |
| Example 19 | C.I. Acid Black 115 (3) Glycerol (10) Urea (20) Benzyl alcohol (2) Water (75) | C.I. Solvent Blue 65 (3) C.I. Solvent Blue 67 (4) Ethyl alcohol (93) | C.I. Solvent Red 118 (3) C.I. Solvent Red 132 (4) Ethyl alcohol (93) | C.I. Solvent Yellow 151 (3) C.I. Solvent Yellow 153 (4) Ethyl alcohol (93) |
| Example 20 | Dye of Compound (II) (1.5) C.I. Food Black 2 (1.5) Tetraethylene glycol (5) Thiodiglycol (10) 2-propanol (3) Water (79) | C.I. Solvent Blue 135 (3) Diethylene glycol (15) Methyl alcohol (80) | C.I. Solvent Red 118 (3) Diethylene glycol (15) Methyl alcohol (80) | C.I. Solvent yellow 154 (3) Diethylene glycol (15) Methyl alcohol (80) |
| Example 21 | Dye of Compound (III) (1.5) C.I. Food | C.I. Solvent Blue 67 (6) Ethylene glycol | C.I. Solvent Red 132 (6) Ethylene glycol | C.I. Solvent Yellow 153 (6) Ethylene |

TABLE 10-continued (each numeral in parentheses indicates a component ratio)

| Black ink | Cyan ink | Magenta ink | Yellow ink |
|---|---|---|---|
| Black 2 (1.5) Ethylene glycol (10) Urea (5) Cyclohexanol (2) Water (80) | monoethyl ether (94) | monoethyl ether (94) | glycol monoethyl ether (94) |

The Compounds (II) and (III) shown in Table 10 are expressed by the following formulas:

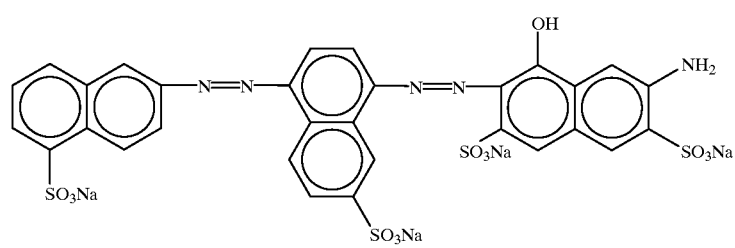

(II)

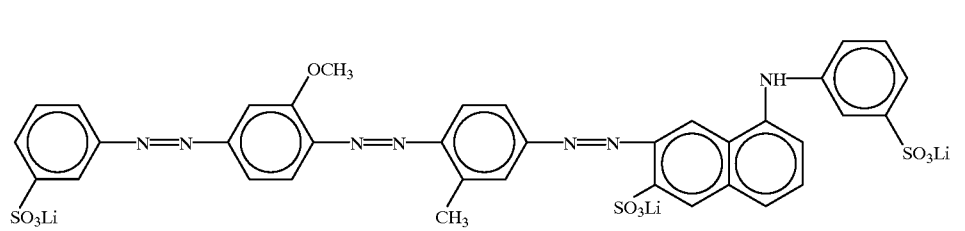

(III)

When the same evaluations $T_1$ to $T_{10}$ were made by the same method as that employed in Examples 1 to 7 using each of the inks of the above Examples 15 to 21 and a recording apparatus having an on-demand type recording head (discharge orifice diameter of 50 μm, piezoelectric oscillator driving voltage of 60 V and frequency of 4 KHz) employing a piezoelectric oscillator for discharging ink, good results were obtained, as in Examples 1 to 7.

Table 11 shows the surface tension of each of the inks used in Examples 15 to 21 of the method of the present invention and the results of the evaluations $T_6$ to $T_{10}$ of the images obtained.

TABLE 11

Evaluation Results

| No. | $T_6$ Surface tension of ink (dyne/cm) | $T_6$ Fixing time (sec.) | $T_7$ Printing quality of Bk | $T_8$ Two-color mixture printing quality | $T_9$ OD value of Bk | $T_{10}$ Boundary bleeding between different colors |
|---|---|---|---|---|---|---|
| Example 15 | Bk ≧ 40 C, M, Y ≦ 40 | Bk > 5 C, M, Y ≦ 5 | good | good | 1.2≦ | good |
| Example 16 | Bk ≧ 40 C, M, Y ≦ 40 | Bk > 5 C, M, Y ≦ 5 | good | good | 1.2≦ | good |

TABLE 11-continued

Evaluation Results

| No. | $T_6$ Surface tension of ink (dyne/cm) | $T_6$ Fixing time (sec.) | $T_7$ Printing quality of Bk | $T_8$ Two-color mixture printing quality | $T_9$ OD value of Bk | $T_{10}$ Boundary bleeding between different colors |
|---|---|---|---|---|---|---|
| Example 17 | Bk ≧ 40 C, M, Y ≦ 40 | Bk > 5 C, M, Y ≦ 5 | good | good | 1.2≦ | good |
| Example 18 | Bk ≧ 40 C, M, Y ≦ 40 | Bk > 5 C, M, Y, ≦ 5 | good | good | 1.2≦ | good |
| Example 19 | Bk ≧ 40 C, M, Y ≦ 40 | Bk > 5 C, M, Y, ≦ 5 | good | good | 1.2≦ | good |

TABLE 11-continued

Evaluation Results

| No. | Surface tension of ink (dyne/cm) | $T_6$ Fixing time (sec.) | $T_7$ Printing quality of Bk | $T_8$ Two-color mixture printing quality | $T_9$ OD value of Bk | $T_{10}$ Boundary bleeding between different colors |
|---|---|---|---|---|---|---|
| Example 20 | Bk $\geq$ 40<br>C, M, Y $\leq$ 40 | Bk > 5<br>C, M, Y, $\leq$ 5 | good | good | 1.2$\leq$ | good |
| Example 21 | Bk $\geq$ 40<br>C, M, Y $\leq$ 40 | Bk > 5<br>C, M, Y, $\leq$ 5 | good | good | 1.2$\leq$ | good |

When the same investigations were made by using a recording apparatus having an on-demand multihead (discharge orifice diameter of 35μ, heat generating resistor resistance of 150 Ω, driving voltage of 30 V, frequency of 2 KHz) in which thermal energy is supplied to the ink contained in the head to generate droplets for recording, excellent results were obtained in all examples.

Comparative Examples 13 to 18

Each of inks having the components and component ratios shown in Table 12 was prepared as a comparative example by the same method, and were subjected to the same evaluations as those in the examples.

As a result, in all comparative examples, the items of the evaluations $T_6$ to $T_{10}$ were not simultaneously satisfied, as shown in Table 13 below.

TABLE 12

(each numeral in parentheses indicates a component ratio)

| | Black ink | Cyan ink | Magenta ink | Yellow ink |
|---|---|---|---|---|
| Comparative Example 13 | C.I. Solvent Black 18 (5)<br>Ethyl alcohol (70)<br>Ethylene glycol (25) | C.I. Solvent Blue 33 (5)<br>Ethyl alcohol (70)<br>Ethylene glycol (25) | C.I. Solvent Red 25 (5)<br>Ethyl alcohol (70)<br>Ethylene glycol (25) | C.I. Solvent Yellow 1 (5)<br>Ethyl alcohol (70)<br>Ethylene glycol (25) |
| Comparative Example 14 | C.I. Food Black 1 (3)<br>Ethyl alcohol (5)<br>Ethylene glycol (15)<br>Emulgen 909 (Kao) (0.1)<br>Water (76.9) | C.I. Solvent Blue 33 (5)<br>Ethyl alcohol (70)<br>Ethylene glycol (25) | C.I. Solvent Red 25 (5)<br>Ethyl alcohol (70)<br>Ethylene glycol (25) | C.I. Solvent Yellow 1 (5)<br>Ethyl alcohol (70)<br>Ethylene glycol (25) |
| Comparative Example 15 | C.I. Direct Black 168 (3)<br>Thiodiglycol (10)<br>Monoethanol amine (5)<br>1-propanol (2)<br>Water (80) | C.I. Direct Blue 86 (3)<br>Thiodiglycol (10)<br>Monoethanol amine (5)<br>1-propanol (2)<br>Water (80) | C.I. Acid Red 92 (3)<br>diglycol (10)<br>Monoethanol amine (5)<br>1-propanol (2)<br>Water (80) | C.I. Acid Yellow 23 (3)<br>Thiodiglycol (10)<br>Monoethanol amine (5)<br>1-propanol (2)<br>Water (80) |
| Comparative Example 16 | Aizen Cathilon Black BXH (Hodogaya Chemical) (3)<br>N-methyl-2-pyrrolidone (7)<br>Glycerol (10)<br>Acetylenol EH (Kawaken Fine Chemical) (0.2)<br>Water (75) | C.I. Solvent Blue 65 (3)<br>C.I. Solvent Blue 67 (4)<br>Ethyl alcohol (93) | C.I. Sci-vent Red 118 (3)<br>C.I. Solvent Red 132 (4)<br>Ethyl alcohol (93) | C.I. Solvent Yellow 151 (3)<br>C.I. Solvent Yellow 153 (4)<br>Ethyl alcohol (93) |
| Comparative Example 17 | C.I. Acid Black 115 (3)<br>Glycerol (10)<br>Urea (10)<br>Benzyl alcohol (2)<br>Water (75) | C.I. Direct Blue 86 (3)<br>Glycerol (10)<br>Urea (10)<br>Benzyl alcohol (2)<br>Acetylenol EH (Kawaken Fine Chemical) (0.2)<br>Water (74.8) | C.I. Acid Red 92 (3)<br>Glycerol (10)<br>Urea (10)<br>Benzyl alcohol (2)<br>Acetylenol EH (Kawaken Fine Chemical) (0.2)<br>Water (74.8) | C.I. Acid Yellow 23 (3)<br>Glycerol (10)<br>Urea (10)<br>Benzyl alcohol (2)<br>Acetylenol EH (Kawaken Fine Chemical) (0.2)<br>Water (74.8) |
| Comparative Example 18 | C.I. Direct Black 168 (3)<br>Thiodiglycol (10)<br>Monoethanol amine (5)<br>1-propanol (2)<br>Emulgen 909 (Kao) (0.1)<br>Water (79.9) | C.I. Solvent Blue 115 (3)<br>Butyl acetate (10) | C.I. Solvent Red 219 (3)<br>Butyl acetate (10) | C.I. Solvent Yellow 121 (3)<br>Butyl acetate (10) |

TABLE 13

| No. | Surface tension of ink (dyne/cm) | $T_6$ Fixing time (sec.) | $T_7$ Printing quality of Bk | $T_8$ two-color mixture printing quality | $T_9$ OD value of Bk | $T_{10}$ Boundary bleeding between different colors |
|---|---|---|---|---|---|---|
| Comparative example 13 | Bk ≦ 40 C, M, Y ≦ 40 | Bk ≦ 5 C, M, Y ≦ 5 | large dot size, and dim edge | good | 1.2> | good |
| Comparative example 14 | Bk ≦ 40 C, M, Y ≦ 40 | Bk ≦ 5 C, M, Y ≦ 5 | large dot size, and dim edge | good | 1.2> | good |
| Comparative example 15 | Bk > 40 C, M, Y > 40 | Bk > 5 C, M, Y > 5 | good | non-uniform dot shape and noticeable feathering | 1.2≦ | noticeable boundary bleeding |
| Comparative Example 16 | Bk ≦ 40 C, M, Y ≦ 40 | Bk ≦ 5 C, M, Y ≦ 5 | large dot size, and dim edge | good | 1.2> | good |
| Comparative Example 17 | Bk ≦ 40 C, M, Y ≦ 40 | Bk ≦ 5 C, M, Y ≦ 5 | large dot size, and dim edge | good | 1.2> | good |
| Comparative Example 18 | Bk ≧ 40 C, M, Y ≦ 40 | Bk ≦ 5 C, M, Y ≦ 5 | good | When Bk and one of C, M and Y were superposed, the dot shape is non-uniform and feathering was noticeable. | 1.2≦ | Boundary bleeding between Bk and one of C, M and Y was noticeable. |

As described above, the ink jet recording method of the present invention can obtain a high-quality Bk image having a high density and sharp edges even on recording paper having high flexibility and a high degree of sizing because the fixing properties of each of the C, M and Y inks on the same recording material are better than those of the Bk ink.

Further, when two inks of different colors are superposed and printed, the image obtained has no irregular line thickening. When images are continuously printed adjacent to each other by inks of two different colors, a clear color image without boundary bleeding can be obtained.

Although the present invention has been described with respect to what is considered to be the preferred embodiments, it is understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink set for recording an image onto a recording material selected from the group consisting of wood-free paper, medium quality paper and non-sized paper, comprising a black ink and a plurality of color inks, the black ink containing an anionic compound or a cationic compound, the respective color inks containing a cationic compound or an anionic compound so as to ionically react with the black ink when the black ink and one of the color inks are mixed, wherein each of the color inks has a surface tension of not more than 40 dyne/cm at a temperature under which the recording material is put, and wherein the black ink has a surface tension greater than those of the respective color inks.

2. An ink set for recording an image onto a recording material selected from the group consisting of wood-free paper, medium quality paper and non-sized paper, comprising a black ink and a plurality of color inks, the black ink containing a water soluble dye, the respective color inks being formulated so that the water soluble dye in the black ink is rendered insoluble when the black ink is mixed with one of the color inks, wherein each of the color inks has a surface tension of not more than 40 dyne/cm at a temperature under which the recording material is put, and wherein the black ink has a surface tension greater than those of the respective color inks.

3. The ink set according to claim 1 or 2, wherein the plurality of color inks includes a yellow ink, a magenta ink and a cyan ink.

4. The ink set according to claim 1 or 2, wherein the black ink has a fixing time with respect to the recording material of more than 5 seconds but less than or equal to 30 seconds.

5. An ink-jet recording method for recording an image on a recording material selected from the group consisting of wood-free paper, medium quality paper and non-sized paper, the image including a black image and a color image, a part of which may be adjacent to the black image, comprising the steps of:

providing a black ink and a plurality of color inks, the black ink containing an anionic compound or a cationic compound, the respective color inks containing a cationic compound or an anionic compound so as to ionically react with the black ink when the black ink is mixed with at least one of the color inks, wherein each of the color inks has a surface tension of not more than 40 dyne/cm at a temperature under which the recording material is put, and wherein the black ink has a surface tension greater than those of the respective color inks;

applying the black ink on the recording material to form the black image; and applying the color inks on the recording material to form the color image.

6. An ink-jet recording method for recording an image on a recording material selected from the group consisting of wood-free paper, medium quality paper and non-sized paper, the image including a black image and a color image, a part of which may be adjacent to the black image, comprising the steps of:

provide a black ink and a plurality of color inks, the black ink containing a water soluble dye, the respective color inks being formulated so that the water soluble dye in the black ink is rendered insoluble when the black ink is mixed with one of the color inks, wherein each of the color inks has a surface tension of not more than 40 dyne/cm at a temperature under which the recording material is put, and wherein the black ink has a surface tension greater than those of the respective color inks;

applying the black ink on the recording material to form the black image; and applying the color inks on the recording material to form the color image.

7. The ink-jet recording method according to claim 5 or 6, wherein the black ink has a fixing time with respect to the recording material of more than 5 seconds but less than or equal to 30 seconds.

8. The ink-jet recording method according to claim 5 or 6, wherein the step of applying the black ink comprises the steps of:

supplying thermal energy to the black ink; and discharging a droplet of the black ink from an orifice in a ink-jet recording apparatus.

9. The ink-jet recording method according to claim 5 or 6, wherein the step for applying the color inks comprises the steps of:

supplying thermal energy to the respective color inks; and discharging droplets of the respective color inks from orifices in an ink-jet recording apparatus.

10. The ink-jet recording method according to claim 5 or 6, wherein the plurality of color inks includes a yellow ink, a magenta ink and a cyan ink.

11. A process for improving quality of a color image on a recording material selected from the group consisting of wood-free paper, medium quality paper and non-sized paper, the image including a black image and a color image, a part of which is adjacent to the black image, the color image being formed by the steps of: applying a black ink on the recording material and forming the black image; and applying color inks on the recording material and forming the color image, wherein the black ink contains an anionic compound or a cationic compound, and the respective color inks contain a cationic compound or an anionic compound so as to ionically react with the black ink when the black ink and one of the color inks are mixed, wherein each of the color inks has a surface tension of not more than 40 dyne/cm at a temperature under which the recording material is put, and wherein the black ink has a surface tension greater than those of the respective color inks.

12. A process for improving quality of a color image on a recording material selected from the group consisting of wood-free paper, medium quality paper and non-sized paper, the image including a black image and a color image, a part of the color image being adjacent to the black image, the color image being formed by the steps of: applying a black ink on the recording material and forming the black image; and applying color inks on the recording material and forming the color image, wherein the black ink contains a water soluble dye, and the respective color inks are formulated so that the water soluble dye in the black ink is rendered insoluble when the black ink is mixed with one of the color inks, wherein each of the color inks has a surface tension of not more than 40 dyne/cm at a temperature under which the recording material is put, and wherein the black ink has a surface tension greater than those of the respective color inks.

13. The process according to claim 11 or 12, wherein the plurality of color inks includes a yellow ink, a magenta ink and a cyan ink.

14. The process according to claim 11 or 12, wherein the black ink has a fixing time with respect to the recording material of more than 5 seconds but less than or equal to 30 seconds.

* * * * *

UNITED STATES PATENT AND TRADEMARK OFFICE
CERTIFICATE OF CORRECTION

PATENT NO.     : 6,003,987
DATED          : December 21, 1999
INVENTOR(S)    : Mayumi Yamamoto et al.

It is certified that error appears in the above-identified patent and that said Letters Patent is hereby corrected as shown below:

Column 16,
Line 25, Table 5, "<40" should read -- >40 --.

Column 19,
Line 64, Table 7, "Bk$\geqq$50   Bk>50" should read -- Bk$\geqq$40   Bk>5 --.

Signed and Sealed this

Twenty-ninth Day of June, 2004

JON W. DUDAS
*Acting Director of the United States Patent and Trademark Office*